United States Patent [19]

Nyman

[11] Patent Number: 5,586,844
[45] Date of Patent: Dec. 24, 1996

[54] TOOLHOLDER CLAMPING WEDGE WITH INSERT ENGAGING PROTRUSIONS

[75] Inventor: Folke Nyman, Sandviken, Sweden

[73] Assignee: Sandvik AB, Sandviken, Sweden

[21] Appl. No.: 393,685

[22] Filed: Feb. 24, 1995

[30] Foreign Application Priority Data

Mar. 4, 1994 [SE] Sweden .................... 9400742

[51] Int. Cl.$^6$ .................... B23B 27/16; B23B 29/04
[52] U.S. Cl. .......................... 407/105; 407/108
[58] Field of Search ................ 407/41, 49, 50, 407/94, 105, 107–110, 112

[56] References Cited

U.S. PATENT DOCUMENTS

| 2,897,580 | 8/1959 | Huber ........................ 407/109 |
| 3,837,058 | 9/1974 | Barkley et al. ............... 407/109 |
| 3,905,081 | 9/1975 | Wirfelt . | |

FOREIGN PATENT DOCUMENTS

| 1230749 | 5/1986 | U.S.S.R. ........................ 407/107 |
| 1306651 | 4/1987 | U.S.S.R. ........................ 407/107 |

*Primary Examiner*—M. Rachuba
*Assistant Examiner*—Kenneth J. Hansen
*Attorney, Agent, or Firm*—Burns, Doane, Swecker & Mathis, L.L.P.

[57] ABSTRACT

A toolholder for indexable cutting inserts includes a holder body forming an insert site. A pin projects upwardly at the insert site for entering a center hole of an insert. A clamping wedge is attached to the body by a screw. A rear end of the wedge engages an inclined supporting surface of the body, and a front end of the wedge engages the insert. By tightening the screw, the front end of the wedge pushes against the insert simultaneously downwardly and forwardly to press the insert against the pin and a floor of the insert site. The front end of the wedge includes a pair of forwardly projecting upper protrusions for engaging the top face of the insert, and a pair of forwardly projecting lower protrusions for engaging an edge face of the insert. The upper protrusions, and also the lower protrusions are disposed on opposite sides of an imaginary plane which contains the axis of the pin and the axis of the clamping screw.

11 Claims, 2 Drawing Sheets

TOOLHOLDER CLAMPING WEDGE WITH INSERT ENGAGING PROTRUSIONS

BACKGROUND OF THE INVENTION

The present invention relates to a toolholder in which a cutting insert with a central hole is mechanically clamped against a pin that enters the hole of the insert. The clamping means comprises a wedge clamp which is acting on an edge surface as well as on the top surface of the insert, thus urging the insert forwardly against the pin and downwardly against a bottom supporting surface. The present clamping means will enable clamping of both single and double-sided inserts of basic negative shape having chipbreakers at both its top and bottom surfaces.

In pin-type holders the insert is located in clamped position against a pin in the insert-receiving site of the holder. The insert is brought into clamped position by a clamp device disposed between the pin and an abutment surface of the holder facing the pin. In U.S. Pat. No. 3,905,081 there is disclosed such a cutting tool in which the clamping device comprises two distantly provided extensions formed as convex ridges, one of which is brought into abutment with the top face and one of which is brought into contact with an edge face of the cutting insert.

It has been found that clamping devices of the type described above do not in all respects satisfy the demands of tools used in industry today. One essential requirement is that the size and direction of the clamping force be able to secure the insert in its location against a minimum displacement while being subjected to a maximum cutting force acting on the cutting edge. It is another requirement to secure the insert so that vibrations or intermittent cutting sequences do not reduce the clamping force or produce premature fatigue failures of components and insert locations of such toolholders. It is furthermore desirable to provide a holder such that its components do not reduce the chip flow, or the supply of cool medium supply to the cutting insert, or the degree of engagement of the insert with the workpiece to be cut. These requirements are of utmost importance in turning and copying toolholders where the active cutting edges converge under an acute angle forwardly towards a cutting tip.

SUMMARY OF A PREFERRED EMBODIMENT OF THE INVENTION

All these demands can be satisfactorily fulfilled by a toolholder according to the present invention. The toolholder comprises a clamping wedge with pairs of spaced apart upper and lower protrusions arranged to abut against the top face of the insert and against one edge face of the insert. The contact surfaces of the preferred clamping wedge are in the form of flat contact surfaces in order to reduce the pressure on the cutting insert which normally is made of cemented carbide. This will enable the points where the clamping forces are applied to the clamping wedge to be located as far as possible from the point where the tangential cutting force that is acting on the insert. This is very important in intermittent force actuation on the cutting edge of the insert.

BRIEF DESCRIPTION OF THE INVENTION

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
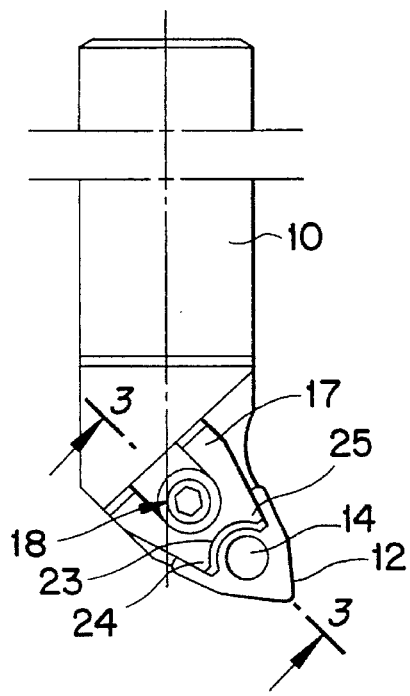
FIG. 1 is a plan view of a cutting toolholder and insert, according to the invention.
Figure 2:
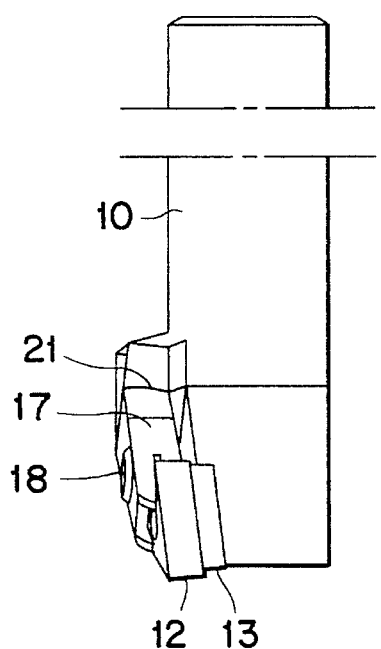
FIG. 2 is a side view of the tool and insert shown in FIG. 1.
Figure 3:
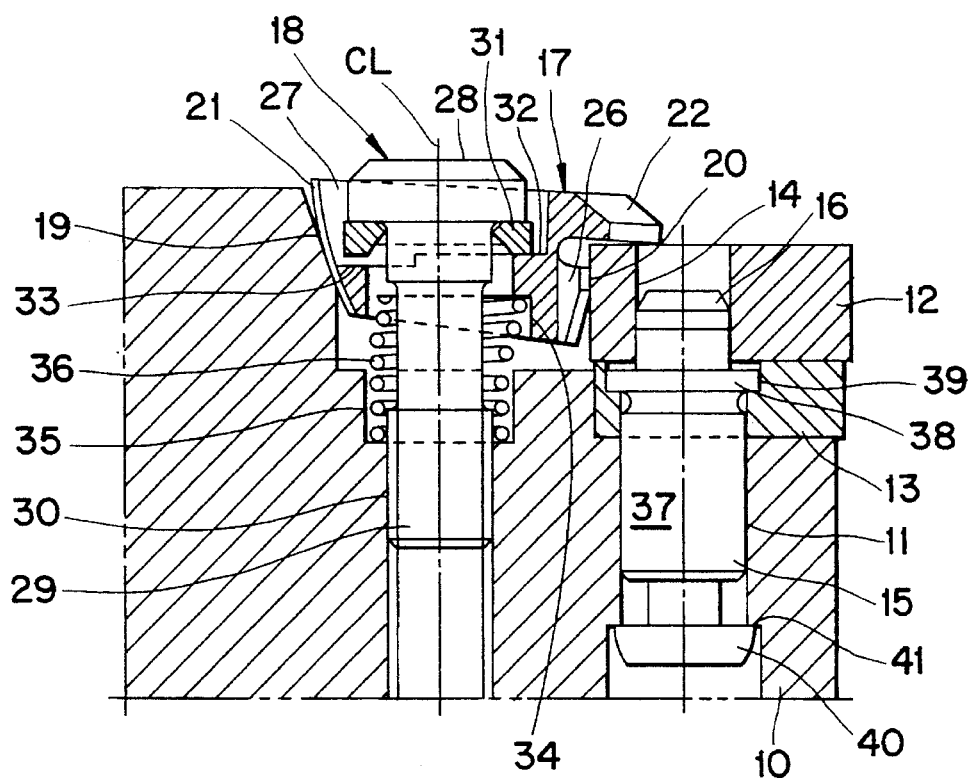
FIG. 3 is an enlarged sectional view taken along the line 3—3 in FIG. 1.
Figure 4:
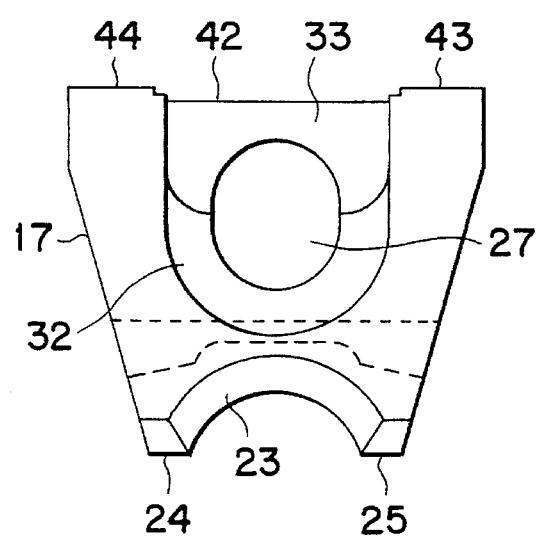
FIG. 4 is a top plan view of the clamping wedge.

In the drawings 10 designates a toolholder of a cutting tool having a top surface, a forward end portion of which defines an insert site in which a bore 11 terminates. A cutting insert 12 is located at the site while being supported against a shim plate 13 at the site. The cutting insert 12 has a central hole 14 that extends entirely through the center of the insert. The cutting insert, which preferably comprises cemented carbide, is of polygonal shape having at each corner two converging cutting edges meeting at an acute angle.

Figure 5:
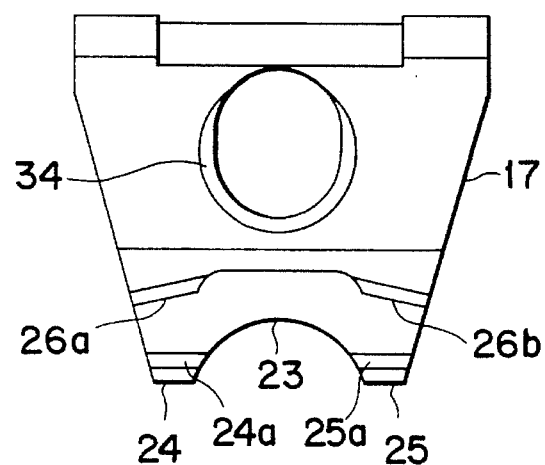
FIG. 5 is a bottom plan view of the clamping wedge.

A locking pin 15 is received in the bore 11, the head portion 16 of the pin engaging a lower portion of the wall of the hole 14. The clamping device that is acting on the insert 12 is a clamping wedge 17 in which a clamping screw 18 is received. When the clamping screw 18 is tensioned the clamping device acts as a wedge and is brought into clamped position between an upstanding support surface 19 of the holder and an adjacent edge surface 20 of the insert whereby the support surface 19 extends downwardly and forwardly. The rear face 21 of the wedge 17 is substantially convexly curved whereas its front portion has a forward extension 22 provided by a pair of upper protrusions 24 and 25 separated by a circularly provided recess 23. The recess 23 partially surrounds the correspondingly curved central hole 14 of the insert, the radius of the recess 23 being substantially equal to or somewhat greater than the radius of the hole 14 or pin portion 16. The undersides of the protrusions 24 and 25 are coplanar flat surfaces 24a and 25a intended for surface abutment against the top face of the insert 12. The wedge is also provided with a pair of spaced-apart lower protrusions 26a and 26b located at a level below the upper protrusions 24, 25. The upper protrusions lie on opposite sides of an imaginary plane (corresponding to the section line 3—3 in FIG. 1. that is also true of the lower protrusions. The lower protrusions are flat and lie in separate planes that form an obtuse angle relative to one another (see FIG. 5). That angle corresponds to the angle formed between two contact surfaces which form an adjacent edge surface 20 of the insert. The clamp screw 18 is centrally provided in a fastener hole (in the form of a slot 27) in the wedge 17 whereby the head 28 of the screw has a flat underside perpendicularly oriented in relation to the direction of the central axis C of the clamp screw 18. The clamp screw 18 is provided with a lower threaded portion 29 which is threadably engaged in a corresponding threaded bore 30 in the holder 10. A portion of the underside of the screw head 28 located immediately behind the forward extension or tip 22 is arranged, possibly via an intermediate plate 31, to abut against a front radial abutment surface 32 of the clamp wedge. The diametrically opposite portion of the clamp underside is not intended to come into corresponding abutment with any similar radial surface. This is provided due to the fact that located directly opposite the radial abutment surface 32, is a rear radial surface 33 that is located on a lower plane than the front radial abutment surface 32.

The surfaces 32 and 33, located at different levels as aforesaid, are arranged around respective portions of the slot 27. There is also a further recess 34 arranged around the slot 27 which is eccentrically provided in relation to the central axis CL of the screw 18, i.e., the recess or bore 34 is offset forwardly with respect to the slot 27. The threaded bore 30 extends upwards to a counter bore 35 having a somewhat larger diameter than the threaded bore 30 for the receipt of a spiral-shaped spring 36 which is arranged to impose an upward force on the screw and the wedge. The forward offsetting of the bore 34 is accomplished by having the central axis of the recess 34 eccentrically closer to the tip of the insert as compared with the central axis of the bore 35 in the insert side of the toolholder.

With the embodiment shown in FIGS. 1–5, the slot 27 for receiving the screw 18 has been given an oval shape. The slot intersects the radial abutment surface 32 which is C-shaped (as viewed in a direction parallel to the axis CL; see FIG. 4) and is terminated rearwardly at an intermediate position of the oval-shaped slot 27.

The locking pin 15, upon which the insert 12 is located, is provided with a lower cylindrical portion 37 and a radial collar 38 between said cylindrical portion 37 and the head portion 16 of the screw for abutment against a corresponding annular recess 39 in the shim plate 13. The locking pin 15 is secured in the holder by means of a screw 40 that is threadably engaged with the bottom of the pin. The radial surface of the head of the screw is urged into abutment with a corresponding radial abutment surface 41 of the holder 10. The locking pin 15 could alternatively be secured to the bore 11 by a friction-fit thereby eliminating the screw 40.

The design of the wedge clamp 17 is preferably of such nature that the recess 27 therein for receiving the screw head 20 has the recessed flat surface 32 which surrounds a front portion of the screw receiving slot 27. The rear flat surface 33 has a straight rear edge 42. There are two distantly provided convex end surfaces 43 and 44 which extend rearwardly a certain distance beyond the rear straight edge 42. This enables a distinct location of the wedge during its abutment against the rear support surface 19 of the holder 10.

The above-described form of the wedge clamp enables its clamping with a relatively small tensioning moment that can be accomplished manually without problems. Force measurements were carried out which show that the size and the direction of the clamping force enables the clamping of the insert while achieving a minimum of insert displacement even when subjected to a maximum of cutting forces acting on its cutting edge.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A toolholder for holding a cutting insert having top and bottom faces, a center through-hole, and an edge face, said toolholder comprising:

a holder body having a top surface, a forward portion of said top surface defining an insert site for receiving an insert, the top surface including a generally upstanding supporting surface spaced rearwardly from said insert site, said supporting surface being inclined downwardly and forwardly;

a pin disposed in said body and having an upper end projecting upwardly at said insert site for entering a center through-hole of an insert to locate the insert;

a clamping wedge mounted on said body for up and down movement relative thereto, said clamping wedge including a rear end for engaging said supporting surface, a front end for engaging an insert mounted at said insert site, and a fastener hole extending downwardly through said clamping wedge, said front end including:

a pair of forwardly projecting upper protrusions disposed on opposite sides of an imaginary plane containing a center axis of said pin and a center axis of said fastener hole, said upper protrusions arranged to bear downwardly against the top face of the insert, a concave surface interconnecting said upper protrusions, said concave surface arranged coaxially with respect to said pin and having a radius of curvature no shorter than a radius of said pin, and a pair of forwardly projecting lower protrusions disposed on opposite sides of said imaginary plane, said lower protrusions arranged to bear forwardly against the edge face of the insert; and a fastener comprising a clamp screw projecting through said fastener hole and threadedly secured in said body for bearing downwardly on said clamping wedge to push said upper protrusions downwardly against the top face of the insert while pushing said rear end downwardly against said supporting surface to cause said lower protrusions to be pushed forwardly against the edge face of the insert.

2. The toolholder according to claim 1, wherein said upper protrusions include flat, coplanar undersides for engaging the top face of the insert.

3. The toolholder according to claim 2, wherein each of said lower protrusions includes a flat front surface for engaging the edge face of the insert.

4. The toolholder according to claim 1, wherein each of said lower protrusions includes a flat front surface for engaging the edge face of the insert.

5. The toolholder according to claim 4, wherein said flat front surfaces lie in separate planes.

6. The toolholder according to claim 1, further including a coil spring disposed in said body in surrounding relationship to said clamp screw for biasing said clamping wedge upwardly.

7. The toolholder according to claim 6, wherein said clamping wedge includes an underside through which said fastener hole extends, a bore formed in said underside to extend partially around said fastener hole for receiving an upper end of said spring, said bore being offset forwardly with respect to said fastener hole.

8. The toolholder according to claim 1, wherein said clamping wedge further includes front and rear radially extending surfaces each surrounding a portion of said fastener hole, said front radially extending surface disposed forwardly with respect to said rear radially extending surface and lying in a plane disposed higher than a plane in which said rear radially extending surface lies, whereby said front radially extending surface constitutes an abutment surface against which a head of said clamp screw engages.

9. The toolholder according to claim 1, wherein said rear end of said clamping wedge includes two convex surfaces spaced apart and situated on opposite sides of said imaginary plane, said rear surfaces engaging said supporting surface.

10. The toolholder according to claim 9, wherein said supporting surface is flat.

11. A toolholder for holding a cutting insert having top and bottom faces, a center through-hole, and an edge face, said toolholder comprising:

a holder body having a top surface, a forward portion of said top surface defining an insert site for receiving an insert, the top surface including a generally upstanding supporting surface spaced rearwardly from said insert site, said supporting surface being inclined downwardly and forwardly;

a pin disposed in said body and having an upper end projecting upwardly at said insert site for entering a center through-hole of an insert to locate the insert;

a clamping wedge mounted on said body for up and down movement relative thereto, said clamping wedge including a rear end for engaging said supporting surface, a front end for engaging an insert mounted at said insert site, and a fastener hole extending downwardly through said clamping wedge, said front end including:

a pair of forwardly projecting upper protrusions disposed on opposite sides of an imaginary plane containing a center axis of said pin and a center axis of said fastener hole, said upper protrusions arranged to bear downwardly against the top face of the insert, and a pair of forwardly projecting lower protrusions disposed on opposite sides of said imaginary plane, said lower protrusions arranged to bear forwardly against the edge face of the insert; and a fastener comprising a clamp screw projecting through said fastener hole and threadedly secured in said body for bearing downwardly on said clamping wedge to push said upper protrusions downwardly against the top face of the insert while pushing said rear end downwardly against said supporting surface to cause said lower protrusions to be pushed forwardly against the edge face of the insert;

said clamping wedge further including front and rear radially extending surfaces each surrounding a portion of said fastener hole, said front radially extending surface disposed forwardly with respect to said rear radially extending surface and lying in a plane disposed higher than a plane in which said rear radially extending surface lies, whereby said front radially extending surface constitutes an abutment surface against which a head of said clamp screw engages.

\* \* \* \* \*